United States Patent
Freitag et al.

(10) Patent No.: US 9,682,589 B2
(45) Date of Patent: Jun. 20, 2017

(54) PART DESIGN GEOMETRY FOR STENCILING EPOXIES THROUGH ORIFICES IN FILM ADHESIVE

(71) Applicant: XEROX CORPORATION, Norwalk, CT (US)

(72) Inventors: Chad D. Freitag, Portland, OR (US); Chanthy Luy, Tigard, OR (US); Samuel V. Schultz, Portland, OR (US); Garry A. Jones, King City, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/599,920

(22) Filed: Jan. 19, 2015

(65) Prior Publication Data

US 2016/0207310 A1    Jul. 21, 2016

(51) Int. Cl.
| | | |
|---|---|---|
| *B41J 2/01* | (2006.01) | |
| *B41N 1/24* | (2006.01) | |
| *B41J 2/16* | (2006.01) | |
| *B32B 7/12* | (2006.01) | |
| *B41J 2/14* | (2006.01) | |
| *B32B 3/18* | (2006.01) | |

(52) U.S. Cl.
CPC .................. *B41N 1/24* (2013.01); *B32B 3/18* (2013.01); *B32B 7/12* (2013.01); *B41J 2/14* (2013.01); *B41J 2/16* (2013.01); *B41J 2/1623* (2013.01); *B32B 2255/00* (2013.01); *B32B 2307/202* (2013.01); *B32B 2457/08* (2013.01); *B41J 2002/14362* (2013.01)

(58) Field of Classification Search
CPC ....... B41J 2/045; B41J 2/16; B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41M 5/0011; B41M 5/0017; B41M 7/00; B41M 7/0072; B41M 5/52; B41M 5/5218
USPC ....................................................... 347/44–67
See application file for complete search history.

(56) References Cited

U.S. PATENT DOCUMENTS

| | | | |
|---|---|---|---|
| 2006/0027623 A1* | 2/2006 | Yanagisawa | B23K 20/004 228/4.5 |
| 2006/0050109 A1* | 3/2006 | Le | B41J 2/161 347/47 |
| 2010/0103224 A1* | 4/2010 | Gerner | B41J 2/14233 347/68 |

\* cited by examiner

*Primary Examiner* — Manish S Shah
(74) *Attorney, Agent, or Firm* — Marger Johnson

(57) ABSTRACT

An apparatus has a first structure, an adhesive layer having a first height adhered to the first structure, the adhesive layer having an array of openings, the adhesive layer having a region adjacent each opening having a height less than a first height. A print head has a stack of plates forming a jet stack, the jet stack having a nozzle plate with an array of nozzles, an array of transducers in contact with the jet stack opposite the nozzle plate, an adhesive layer having a first height adhered to the array of transducers, the adhesive layer having openings adjacent the transducers and regions adjacent the openings having a height less than the first height, and a conductive material in the openings of the adhesive layer in contact with the transducers.

6 Claims, 4 Drawing Sheets

PART DESIGN GEOMETRY FOR STENCILING EPOXIES THROUGH ORIFICES IN FILM ADHESIVE

TECHNICAL FIELD

The embodiments here relate to manufacture of devices having stacks of plates, more particularly to print heads having jet stacks that use standoff layers.

BACKGROUND

Many print head architectures use a stack of plates referred to as a jet stack to route ink from the ink reservoirs to a print substrate, where the plates may consist of thin plates of stainless steel, polymer sheets, etc. The ink flows through chambers and channels formed when the plates are stacked together, exiting the stack through a nozzle, or jet, plate that typically consists of an array of small holes. Electrical signals control a transducer of some sort that acts against a side of the jet stack to pull ink into a chamber adjacent each nozzle and then push it out the nozzle.

Typically, the electrical signals reach the transducers through a flex circuit adhered the jet stack. The flex circuit adheres to the jet stack with an adhesive layer formed of one or more polymer layers. The adhesive layer or layers have an array of holes to allow a conductive paste or other conductive material to contact the transducers and make electrical connections with the flex circuit.

As the need for higher resolution printer increases, the density of the nozzle apertures on the plate increases. This in turn increases the density of the holes in the adhesive standoff layer. The holes generally become smaller with the increased density. When the conductive paste applied to these holes, the air has no outlet, unlike the larger holes that accommodated more air flow. The air becomes trapped and can interfere with the electrical connection between the transducer and the flex circuit causing this connection to fail. This results in signals not reaching the transducer, so ink does not get expelled from the corresponding nozzle correctly, causing imaging artifacts in the printed image.

DETAILED DESCRIPTION OF THE EMBODIMENTS

The discussion here focuses on the manufacture of a print head, or what may be considered a portion of a print head. The embodiments disclosure here may be applicable to any structure using an adhesive layer in which exists an array of holes into which another material is applied and then the adhesive layer.

The term print head as used here means a print head or a portion of a print head. A print head may include a jet stack, the array of transducers, electrical connections between the array of transducers and a circuit that transmits signals to the transducers, umbilicals connected to an ink supply, a local reservoir of ink, etc. Similarly, the term jet stack refers to a stack of plates that when stacked together form manifolds and ink paths that transport ink to a nozzle plate member of the jet stack.

The term 'height' as used here refers to the top to bottom distance on a layer, whether in the jet stack of attached to the jet stack. The discussion will refer to a standoff or adhesive layer having a region of lower height than other regions on the adhesive layer. The region having lower height may also be considered to be 'shorter' or 'thinner' than other regions of the adhesive layer.

Figure 1:
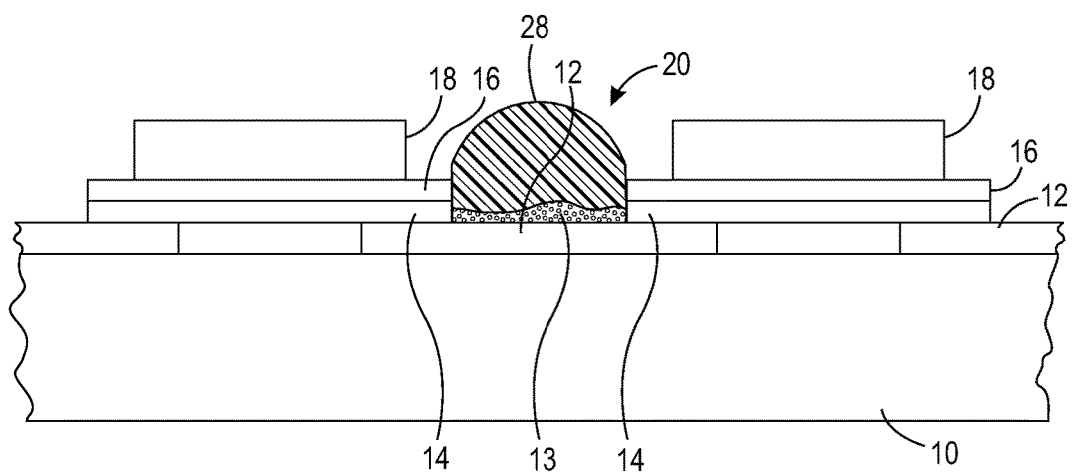
FIG. 1 shows a prior art embodiment of a structure having an adhesive layer.

FIG. 1 shows a prior art embodiment of a first structure, here a jet stack 10 and a corresponding array of transducers 12, having one or more layers attached to it to allow formation of electrical connections that will ultimately connect to a flex circuit. In this embodiment, there are two layers. First, an adhesive layer, or standoff layer, 14, is attached to the transducer array. Then a coverlay 16, which will ultimately connect the adhesive layer and the jet stack/transducer structure to a flex circuit, resides on the adhesive layer 14. One should note that the use of the coverlay may not be needed, depending upon the implementation of the structure, and the flex circuit or second structure may adhere directly to the adhesive layer 14.

Both the adhesive layer 14 and the coverlay 16 have an opening 20, into which an electrically conductive material, such as a paste, is applied. The application of the paste may be accomplished in many ways. In this particular embodiment, a stencil such as 18, is placed over the array of openings such as 20 and the conductive paste is then applied to the stencil, causing the openings 20 to be filled with the conductive paste 28. The stencil 18 would then be removed prior to attaching the flex circuit, not shown.

As the need for higher density jets or nozzles increases, the size of the holes has decreased to the point where air 13 becomes trapped in the opening 20 and interferes with the connection being made by the paste. Embodiments here provide an air vent in the standoff or adhesive layer to allow the air to move away from the conductive paste, making the electrical connection more robust.

Figure 2:
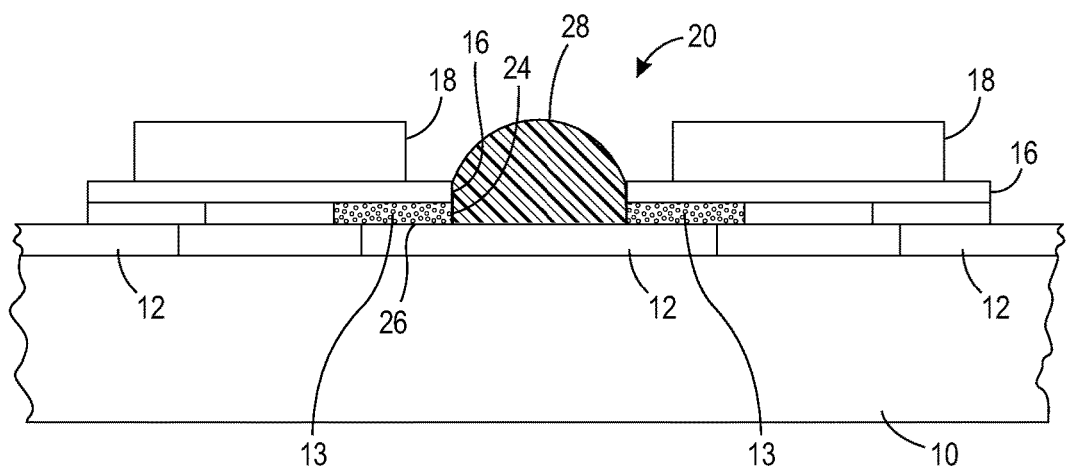
FIG. 2 shows an embodiment of a structure having an adhesive layer with air vents.

As shown in FIG. 2, the jet stack 10 and the transducers 12 are the same. However, the adhesive layer 24 now has regions such as 26 that have lower height than other regions of the adhesive layer. The regions of lower height form air vents when the conductive paste or other material fills the opening 20. The air 13 pushes into these regions or vents, moving it away from the paste, allowing the paste to make a more solid connection to the transducer.

Figure 3:
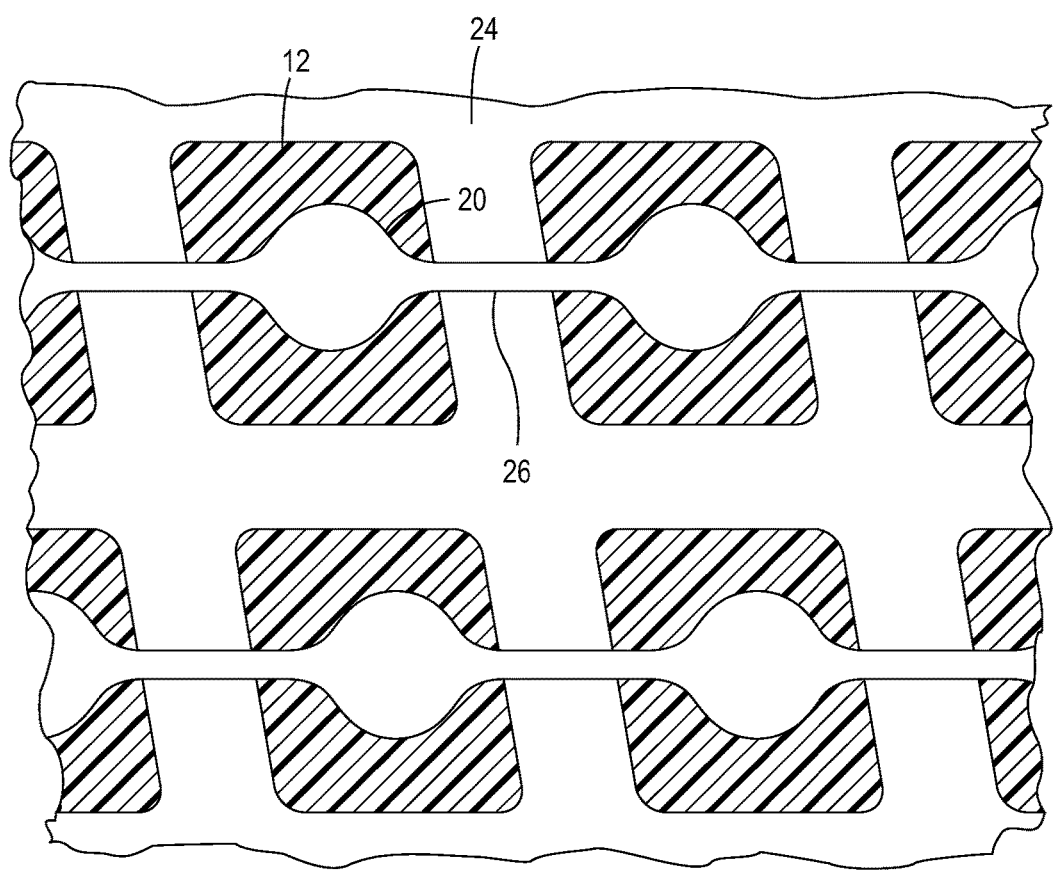
FIG. 3 shows an embodiment of a portion of a print head having an adhesive layer with air vents.

FIG. 3 shows an example of an array of transducers having applied to it electrically conductive paste, with the air vents in the standoff. The adhesive layer 24 has openings that allow one to see the transducers such as 12. A conductive paste such as silver epoxy has filled the openings such as 20. Any air in the opening that cannot otherwise escape moves into the vent regions such as 26.

Figure 4:
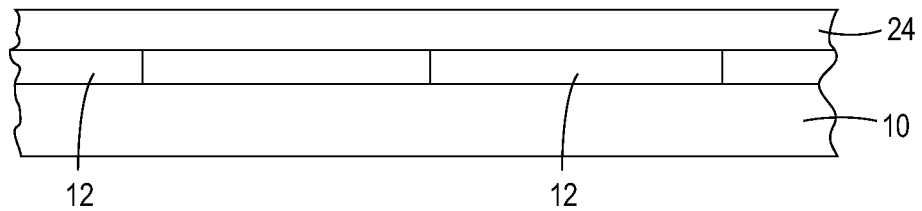
FIGS. 4-9 show a process of manufacturing a print head.
Figure 5:
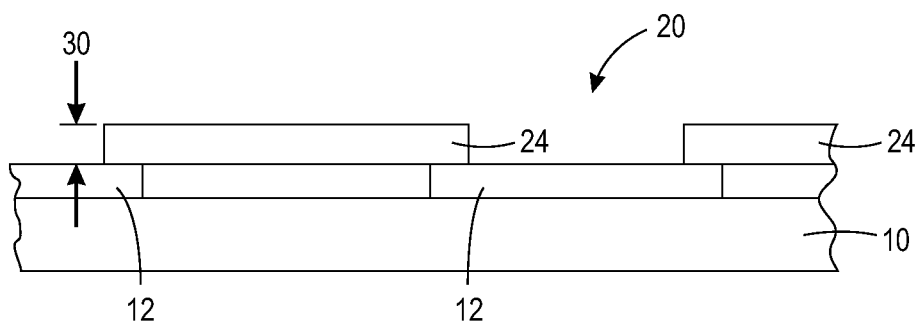

FIGS. 4-8 show an embodiment of a process of making such a structure. In FIG. 4, the first structure has the standoff adhesive layer 24 attached. As mentioned above, the first structure may be any type of structure for which electrical connection to another structure is desired, but for the discussion here consists of the jet stack 10 and the transducer array 12. In FIG. 5, the standoff layer 24 has openings such as 20 formed in it. One should note that the standoff layer may already have the openings prior to attaching to the first structure, but for purposes of this discussion, the openings will be formed after attachment to the structure. The openings may be formed by laser ablation/cutting, cutting without a laser, punching, etching, etc.

Figure 6:
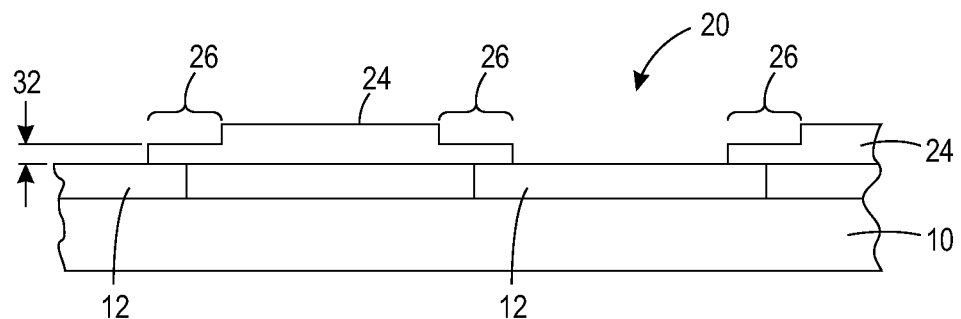

In FIG. 6, the adhesive layer 24 has regions formed that have lower height than other regions of the standoff. Referring back to FIG. 5, the standoff 24 has a height of a dimension shown by 30. In FIG. 6, the region 26 having a lower height than the other regions of the standoff has a dimension shown by 32, where 32 is smaller than 30. In some embodiments, 32 is half the dimension of 30. These regions may be formed by many different methods, including laser ablation/cutting, cutting without a laser, punching, etching, etc., including whatever method is used to form the openings like 20 in the standoff. Alternatively, the regions could be pre-formed in the adhesive layer prior to its attachment to the structure.

Figure 7:
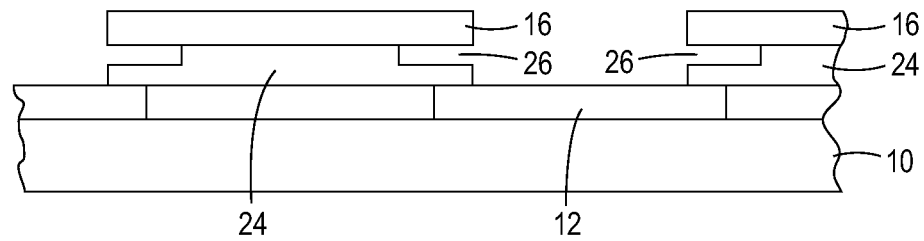

FIG. 7 shows the attachment of the coverlay 16, which also have openings corresponding to the openings in the standoff. The coverlay may provide protection for the flex circuit that will ultimately be attached to the coverlay and the structure. As can be seen in FIG. 7, the gaps or regions 26 lie under the coverlay.

Figure 8:
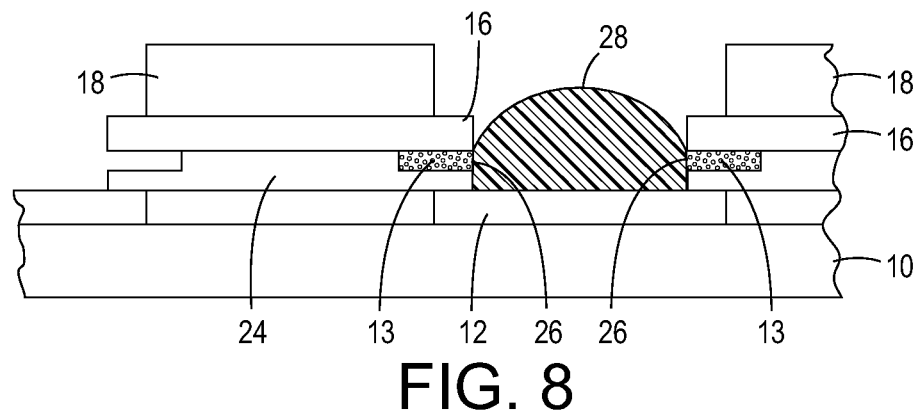

In FIG. 8, the conductive or other filler material 28 is applied to the opening. In the case of it being a conductive material, it provides connection to the transducer array 12 for the flex circuit, shown in FIG. 9. The air 13 gets pushed into the vent region 26, rather than under the adhesive. The application of the material 28 may occur in many ways. In one embodiment, a stencil 18 provides a guide for the application of the material, possibly by doctor blade, dispensing from a printer, etc. After application of the conductive material, the stencil would be removed and the flex circuit attached. As mentioned previously, the second structure may or may not be a flex circuit. The jet stack/transducer structure could be any structure requiring an electrical connection to another structure, and the other structure may be one of many types of structures.

Figure 9:
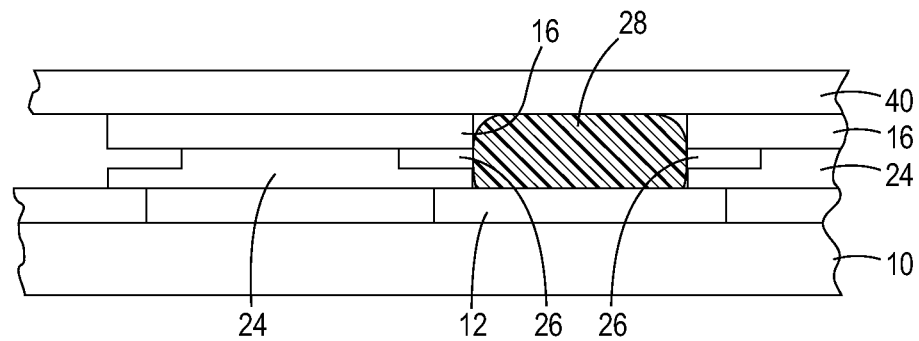

FIG. 9 shows the final device for the print head embodiments. The jet stack 10 has the transducer array 12 attached to it. The transducer array has the standoff 24, with vent regions 26 adhered to it. The coverlay 16 resides on the standoff 24. The opening is filled with conductive material 28 that is then covered by the flex circuit 40, where the conductive material 28 makes connections between the transducer array 12 and the flex circuit.

In this manner, one can achieve higher densities of printing nozzles or jets, with smaller architectures, while alleviating issues with trapped air. As the conductive material is applied, the air in the opening can escape into the vent regions. This results in a more robust electrical connection and eliminates issues with jets dropping out because of bad connections.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A print head, comprising:
    a stack of plates forming a jet stack, the jet stack having a nozzle plate with an array of nozzles;
    an array of transducers in contact with the jet stack opposite the nozzle plate;
    an adhesive layer adhered to the array of transducers, the adhesive layer having a first height, openings adjacent the transducers, and vent regions adjacent the openings, the vent regions formed from regions of the adhesive layer having a height less than the first height; and
    a conductive paste in the openings of the adhesive layer in contact with the transducers.

2. The print head of claim 1, further comprising a coverlay attached to the adhesive layer such that the regions having a height less than the first height form gaps between the adhesive layer and the coverlay, the coverlay having openings corresponding to the openings in the adhesive layer.

3. The print head of claim 1, further comprising a flex circuit attached to the adhesive layer, wherein the conductive paste forms an electrical connection between the transducers and the flex circuit.

4. The print head of claim 3, wherein the flex circuit attaches to the adhesive layer by a coverlay, the coverlay having openings corresponding to the openings in the adhesive layer.

5. The print head of claim 1, wherein the conductive paste comprises silver epoxy.

6. The print head of claim 1, wherein the height less than a first height is half the height of the first height.

* * * * *